United States Patent
Tokushima et al.

(10) Patent No.: US 9,404,535 B2
(45) Date of Patent: Aug. 2, 2016

(54) SLIDING BEARING ASSEMBLY

(71) Applicant: HITACHI CHEMICAL COMPANY, LTD., Tokyo (JP)

(72) Inventors: Hidekazu Tokushima, Kashiwa (JP); Hideaki Kawata, Matsudo (JP); Daisuke Fukae, Matsudo (JP); Osamu Mawatari, Matsudo (JP); Hideki Akita, Tsuchiura (JP); Makoto Sugaya, Narita (JP); Akiko Satou, Ushiku (JP); Osamu Gokita, Tsukuba (JP); Shigeyuki Sakurai, Tsukuba (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 14/426,902

(22) PCT Filed: Sep. 24, 2013

(86) PCT No.: PCT/JP2013/076459
§ 371 (c)(1),
(2) Date: Mar. 9, 2015

(87) PCT Pub. No.: WO2014/051136
PCT Pub. Date: Apr. 3, 2014

(65) Prior Publication Data
US 2015/0240870 A1    Aug. 27, 2015

(30) Foreign Application Priority Data

Sep. 25, 2012 (JP) ................. 2012-210499

(51) Int. Cl.
*F16C 33/04* (2006.01)
*F16C 33/10* (2006.01)
(Continued)

(52) U.S. Cl.
CPC ............... *F16C 33/104* (2013.01); *C21D 9/40* (2013.01); *C22C 38/00* (2013.01); *C22C 38/04* (2013.01);
(Continued)

(58) Field of Classification Search
CPC ...... F16C 17/02; F16C 33/104; F16C 33/128; F16C 33/145; F16C 2204/66
USPC .................................................. 384/276, 279
See application file for complete search history.

(56) References Cited

U.S. PATENT DOCUMENTS

| 6,513,979 B2 * | 2/2003 | Mori ..................... F16C 17/107 384/100 |
| 7,186,028 B2 * | 3/2007 | Asada ................... F16C 17/107 384/114 |
| 2013/0084203 A1 | 4/2013 | Fukae et al. |

FOREIGN PATENT DOCUMENTS

| JP | H11-117940 A | 4/1999 |
| JP | 2009-155696 A | 7/2009 |

(Continued)

OTHER PUBLICATIONS

Dec. 24, 2013 Search Report issued in International Application No. PCT/JP2013/076459.

*Primary Examiner* — Phillip A Johnson
(74) *Attorney, Agent, or Firm* — Oliff PLC

(57) ABSTRACT

A sliding bearing assembly for joints of construction equipment can be provided, in which production cost is reduced by decreasing the used amount of Cu and sulfides having high fixability to a matrix are dispersed. The sliding bearing assembly for joints of construction equipment, includes at least a shaft and a bush made of an iron-based sintered material which functions as a sliding bearing, in which the bush has the overall composition of, by mass %, 0.1 to 10% of Cu, 0.2 to 1.2% of C, 0.03 to 0.9% of Mn, 0.36 to 1.68% of S, and the balance of Fe and inevitable impurities, a metal structure has pores dispersed in a matrix mainly including a martensite structure and sulfide particles precipitated and dispersed, and the sulfide particles are dispersed at 1 to 7 volume % in the matrix.

6 Claims, 3 Drawing Sheets

(51) Int. Cl.
*C22C 38/00* (2006.01)
*F16C 17/00* (2006.01)
*F16C 11/02* (2006.01)
*F16C 33/12* (2006.01)
*C22C 38/04* (2006.01)
*C22C 38/16* (2006.01)
*C22C 38/60* (2006.01)
*C21D 9/40* (2006.01)
*F16C 33/14* (2006.01)

(52) U.S. Cl.
CPC .................. *C22C 38/16* (2013.01); *C22C 38/60* (2013.01); *F16C 11/02* (2013.01); *F16C 17/00* (2013.01); *F16C 33/128* (2013.01); *F16C 33/145* (2013.01); *C21D 2211/008* (2013.01); *F16C 2204/10* (2013.01); *F16C 2204/60* (2013.01)

(56) References Cited

FOREIGN PATENT DOCUMENTS

| | | | |
|---|---|---|---|
| JP | CN 101469393 A | * | 7/2009 |
| JP | 2013-076152 A | | 4/2013 |

* cited by examiner

SLIDING BEARING ASSEMBLY

TECHNICAL FIELD

The present invention relates to a sliding bearing assembly using powder metallurgy. In particular, the present invention relates to a sliding bearing assembly for joints in construction equipment used under high surface pressure.

BACKGROUND ART

Generally, joints in a hydraulic excavator, which is a type of construction equipment, and arm supporting joints in a crane, which is also a type of construction equipment, have a structure in which a shaft inserted in bearings can be repeatedly and relatively swung within a fixed rotation angle, and a high surface pressure of 60 MPa or more can be received. Therefore, as this type of bearing assembly, a sliding bearing assembly using material having superior abrasion resistance can be used, and it is used by interposing lubricating oil, grease, wax, etc., having a high viscosity between sliding surfaces thereof. In such a sliding bearing assembly, it is necessary to sufficiently supply lubricating oil to the sliding surfaces, and as a result, a smooth bearing action can be obtained by preventing metallic contact to avoid abrasion, even if it is used under a high surface pressure. Therefore, a bush for the sliding bearing assembly is made of materials such as heat-treated carbon steel, high strength brass, etc., and in recent years, sintered material containing 10 to 30 weight % of Cu can be specifically used, for example, as described in Patent Publication 1.

The Patent Publication 1 is Japanese Unexamined Patent Application Publication No. Hei 11-117940.

DISCLOSURE OF THE INVENTION

Problems Solved by the Invention

Generally, when a large amount of Cu is contained in an iron-based sintered alloy used in the bush in a sliding bearing assembly, soft copper phases or copper alloy phases are dispersed in the iron matrix. Therefore, conformability with a mated member is improved, since attacking of the mated member is decreased and the bush is allowed to moderately deform. Furthermore, when the copper phases or the copper alloy phases are dispersed in the matrix, the strength of the iron-based sintered alloy is decreased. In addition, since the price of copper ingots has suddenly risen in recent years, in the technique in which 10 to 30 weight % of Cu is used, as described in Patent Publication 1, the production cost is increased, and the technique is not in practical use.

However, when the Cu content is reduced, the copper phases or the copper alloy phases dispersed in the iron matrix are decreased, and as a result, the abrasion resistance is deteriorated and the attacking the mated member is increased.

In contrast, a technique in which manganese sulfide phases are dispersed in a matrix by adding manganese sulfide powder to raw powder, is well-known. However, in this technique, fixability of manganese sulfide to the matrix is low and the phases often drop out in sliding. Furthermore, manganese sulfide powder inhibits the sintering of the raw powder, and as a result, strength of a sintered alloy is decreased.

Therefore, an object of the present invention is to provide a sliding bearing assembly for joints of construction equipment in which production cost is reduced by decreasing the used amount of Cu and sulfides having high fixability to a matrix are dispersed.

Means for Solving the Problems

The sliding bearing assembly according to the present invention is used for joints of construction equipment, it includes at least a shaft and a bush made of an iron-based sintered material which functions as a sliding bearing, in which the bush has the overall composition consisting of, by mass %, 0.1 to 10% of Cu, 0.2 to 1.2% of C, 0.03 to 0.9% of Mn, 0.36 to 1.68% of S, and the balance of Fe and inevitable impurities, a metal structure has pores dispersed in a matrix mainly comprising a martensite structure and sulfide particles precipitated and dispersed, and the sulfide particles are dispersed at 1 to 7 volume % in the matrix.

In the following, grounds for numerical limitations in the bush of the sliding bearing assembly of the present invention will be explained with an effect of the present invention. Here, in the following, "%" means "mass %". In the bush of the sliding bearing assembly of the present invention, a main component is Fe having a higher strength than that of Cu, and a matrix structure is an iron-based matrix (iron alloy based matrix). A metallic structure of the bush is a structure in which sulfides and pores are dispersed in this iron matrix. The iron matrix is formed by iron powder. The pores are formed by voids remaining between powder particles in the compacting of raw powder in the iron matrix formed by bonding the raw powder, according to a powder metallurgy method.

Generally, the iron powder contains about 0.03 to 1.0% of Mn due to production method, and therefore, the iron matrix contains a small amount of Mn. Then, sulfide particles made of manganese sulfide, etc., are precipitated as a solid lubricant in the matrix by adding S. Here, since the manganese sulfide is precipitated as a fine particle in the matrix, machinability is improved. However, since the particle is too fine to contribute to slidability, improvement of slidability is small. Therefore, in the present invention, more S is added to the small amount of S to react with Mn contained in the matrix, and iron sulfide (FeS) is formed by binding this additional S with Fe, which is a main component. Thus, sulfide particles precipitated in the matrix consist primarily of iron sulfide formed by Fe, which is a main component and manganese sulfide formed by Mn in which a part is an inevitable impurity.

The iron sulfide contains sulfide particles having a suitable size for improving slidability as a solid lubricant, and is uniformly precipitated and dispersed in the matrix, in order to bind with Fe, which is a main component in the matrix.

As described above, in the present invention, the sulfide is precipitated by further adding S to S to bind with Mn contained in the matrix and by binding with Fe which is a main component in the matrix. However, when the content of the sulfide particles precipitated and dispersed in the matrix is less than 1 volume %, a lubricating effect is sufficiently obtained and the slidability is decreased. On the other hand, the lubricating effect of the bush is improved as the content of the sulfide particle increases; however, when the sulfide content in the matrix is too high, the strength of the bush is decreased. Therefore, it is necessary to decrease the content of the sulfide particles to 7 volume % or less, in order to obtain the strength resisting a high pressure of 60 MPa. That is, the content of the sulfide particle in the matrix is 1 to 7 volume % of the matrix.

The S content is 0.36 to 1.68 mass % in the overall composition in order to obtain the sulfide, which primarily contains iron sulfide as this content. When the S content is less than 0.36 mass %, it is difficult to obtain the sulfide particles at a desired content, and in contrast, when it exceeds 1.68 mass %, the sulfide particles are excessively precipitated.

S is supplied by adding iron sulfide powder in an easily decomposable form to the raw powder that contains mainly iron powder. In this case, S is supplied by decomposing the iron sulfide powder in sintering, and by binding S with Fe presented on a circumference of the iron sulfide powder, FeS is formed and a eutectic liquid phase is generated between Fe and S, and thus, growth of necks between the powder particles is facilitated by liquid phase sintering. In addition, S is uniformly diffused from this eutectic liquid phase to the iron matrix, a part of S is precipitated as manganese sulfide in the iron matrix by binding with Mn of the iron matrix, and the remainder of S is precipitated as an iron sulfide in the iron matrix.

In this way, the sulfide, such as manganese sulfide, iron sulfide, etc., is precipitated in the matrix by binding S with Mn and Fe and S in the matrix, and therefore, it is more uniformly dispersed than those in conventional techniques in which the sulfide is dispersed by adding. Additionally, since the sulfide is precipitated and dispersed, it is firmly adhered to the matrix, it does not easily drop out in sliding, and it has superior slidability for a long time.

Furthermore, as described above, the liquid phase sintering is carried out and the raw powders are suitably dispersed, and consequently, the strength of the iron matrix is improved and abrasion resistance of the iron matrix is improved. Therefore, in the bush in the sliding bearing assembly of the present invention, since the solid lubricant firmly adhered to the matrix is uniformly dispersed not only in the pores and at the powder grain boundary, but also in the matrix, the slidability and the matrix strength are improved, and the abrasion resistance is improved.

The iron matrix has a metallic structure in which martensite is the primary structure, in order to be able to use the bush in the sliding bearing assembly of the present invention, even if a high surface pressure of 60 MPa is applied. Here, the metallic structure in which the martensite is the primary structure means a structure in which the martensite in the iron matrix is 60% or more by cross sectional area ratio, and it is preferable that the martensite in the iron matrix be 80% or more by cross sectional area ratio. That is, the martensite has a structure which is hard and which has a high strength, and by having a structure in which such martensite in the matrix is 60% or more, the plastic deformation of the matrix can be prevented and superior slidablity can be obtained, even if it is used under a sliding condition in which a high surface pressure is applied. Although it is most preferable that all of the matrix structure be martensite, some of the iron matrix may have a metallic structure such as sorbite, troostite, and bainite.

An example of the metallic structure of the bush in the sliding bearing assembly of the present invention is shown in FIG. 1. FIG. 1A is a photograph showing the metal structure, and FIG. 1B is a schematic view in which positions of the sulfide are shown by gray and positions of the pores are shown by black in the photograph of the metallic structure in FIG. 1A. In the FIG. 1B, a part shown by white is a part of the matrix structure, and this part is a martensitic phase, as is apparent from the photograph of the metallic structure in FIG. 1A. The sulfide (gray part) is precipitated and dispersed in the matrix, so that some of it exists in the pores and most of it is dispersed in the matrix.

In the bush in the sliding bearing assembly of the present invention, Cu and C are dissolved in the iron matrix, in order to strengthen the iron matrix, and the iron matrix is used as an iron alloy. Cu is dissolved in the iron matrix, and it contributes to strengthening the iron matrix. It is necessary that the Cu content be 0.1 mass % or more in this matrix strengthening. When the Cu content is 3.5 mass % or more, supersaturated Cu is precipitated and dispersed in the matrix as a soft Cu phase, and as a result, attacking of mated material can be decreased. In addition, an interface, which is a starting point of precipitation of the sulfide, is formed between circumferential Fe and Cu by Cu precipitated in the iron matrix. Therefore, the sulfide is easily precipitated and dispersed in the matrix by containing Cu, and the sulfide is not in a state in which it exists in pores and is instead in a state in which it firmly adheres to the matrix. However, when the Cu content is too high, the strength of the bush is decreased, since numerous copper phases having low strength are dispersed. Therefore, an upper limit of the Cu content is set to be 10 mass %.

When the above Cu is added by adding iron alloy powder in which Cu is dissolved in Fe, the raw powder is hardened and compressibility is deteriorated. Therefore, Cu is added by adding copper powder. An iron powder is wet and covered by Cu liquid phase generated in sintering, and as a result, the copper powder is dispersed in the iron powder. Therefore, since Cu is an element which rapidly disperses in the iron matrix, Cu is uniformly dispersed in the iron matrix to a certain degree, even if Cu is added by adding the copper powder.

Here, in the case in which the copper phase is dispersed in the matrix, some of it often forms copper sulfide. When such copper sulfide is dispersed in the matrix, the content of the iron sulfide is decreased since the copper sulfide is dispersed. However, the slidability is not affected by decreasing the iron sulfide, because the copper sulfide also has a lubricating effect.

The iron matrix is strengthened by dissolving C in the iron matrix, and the matrix has a martensite structure by using C. When the C content is too low, strength and abrasion resistance are decreased by dispersing ferrite having a low strength in the matrix. Therefore, the C content is set to be 0.2 mass or more. In contrast, when the C content is too high, the bush cannot resist a high pressure of 60 MPa by precipitating fragile cementite in a network state. Therefore, an upper limit of the C content is set to be 1.2 mass %. When the above C is added by iron alloy powder in which C is dissolved in Fe, the raw powder is hardened and the compressibility is deteriorated. Therefore, C is added by adding graphite powder.

Mixed powder prepared by mixing each of the above powders, that is, (1) iron powder consisting of 0.03 to 1.0 mass % of Mn and the balance of Fe and inevitable impurities, (2) copper powder, (3) graphite powder and (4) iron sulfide powder, so that the overall composition consists of, by mass %, 0.1 to 10% of Cu, 0.2 to 1.2% of C, 0.03 to 0.9% of Mn, 0.36 to 1.68% of S, and the balance of Fe and inevitable impurities, is used as a raw powder, and the bush in the sliding bearing assembly of the present invention can be produced by compacting and sintering this raw powder.

The compacting is carried out by conventional die methods. The conventional die methods include: a step for filling raw powder into a cavity formed by a die having a die hole for forming an outer shape of a product, a lower punch for forming a lower surface of the product which slidably engages with the die hole, and a core rod for forming an inner shape of the product or a thinning part as necessary; a step for compacting the raw powder by an upper punch for forming an upper surface of the product and the lower punch; and a step for pulling out from the die hole.

The compact is sintered at 1,000 to 1,200° C. in a sintering furnace. Progress of the sintering and dispersion of elements are affected by this heating temperature, that is, a sintering temperature. Here, when the sintering temperature is less than 1,000° C., the Cu liquid phase is not sufficiently generated, and it is difficult to obtain a desired metallic structure. In contrast, when the sintering temperature is more than 1,200° C., the liquid phase is excessively generated, and the shape of the sintered compact is easily lost. Therefore, it is preferable that the sintering temperature be 1,000 to 1,200° C.

The sintered compact is hardened so that the majority of the matrix has a martensite structure. The hardening is carried out by rapidly cooling in oil or water, after the sintered compact is heated over an austenite transformation temperature, in the same manner as in conventional methods. The heating temperature in hardening is suitably 820 to 1,000° C. As an atmosphere, non-oxidizing gas is used, and carburizing gas may be used.

The hardened sintered compact has a hard and fragile metallic structure, since distortion excessively accumulates by hardening. Therefore, the sintered compact after hardening is annealed by heating at 150 to 280° C. again and by cooling to an ordinary temperature in the same manner as in the conventional techniques. According to such annealing, an internal stress is decreased, and distortion generated by hardening is removed without decreasing the hardness of the sintered compact. In this case, when a heating temperature of the annealing is less than 150° C., the distortion is not sufficiently removed, and in contrast, when it exceeds 280° C., low carbon martensite is easily decomposed to ferrite and cementite, and the hardness is decreased.

In the bush in the sliding bearing assembly of the present invention obtained by the above steps, the sulfide particles are precipitated and dispersed in the matrix in which the majority is martensite. The sulfide is dispersed so that the main component is iron sulfide and some of it is manganese sulfide or copper sulfide. These sulfide particles have superior slidability, and this contributes to improve slidability of the bush. Here, when the Cu content in the raw powder is 3.5 mass % or more, copper phases are further dispersed in the matrix, and the attacking of the mated material is further lowered. In addition, the liquid phase sintering is carried out and the raw powders are suitably dispersed, and consequently, the strength of the iron matrix is improved and abrasion resistance of the iron matrix is improved. Therefore, in the bush in the sliding bearing assembly of the present invention, since the solid lubricant firmly adhered to the matrix is uniformly dispersed, not only in the pores and at powder grain boundary, but also in the matrix, the slidability and the matrix strength are improved, and the abrasion resistance is improved.

Here, as a material of a shaft in the sliding bearing assembly of the present invention, for example, S45C can be used. The sliding bearing assembly having such a shaft and the above bush is suitably used under sliding conditions in which the surface pressure is 60 MPa or more and a maximum rotating speed is 1.2 to 3 m per minute.

According to the present invention, a sliding bearing assembly for joints of construction equipment can be provided in which production cost is reduced by decreasing the used amount of Cu and sulfides having a high fixability to a matrix are dispersed.

BRIEF DESCRIPTION OF THE DRAWING

FIG. 1 is an example of a metallic structure in a bush for a sliding bearing assembly according to the present invention;

EXAMPLES

Figure 1A:
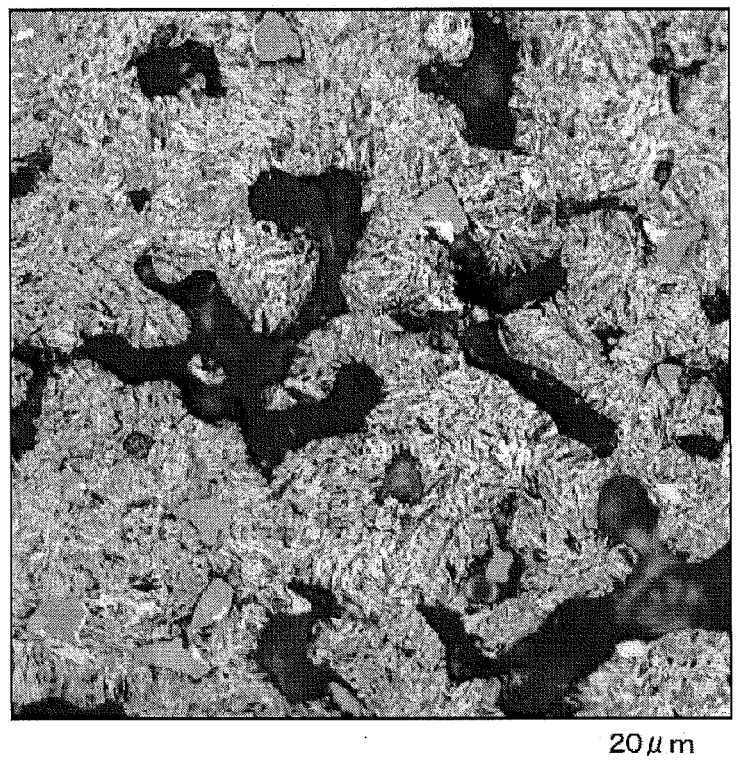
FIG. 1A is a photograph showing the metallic structure.
Figure 1B:
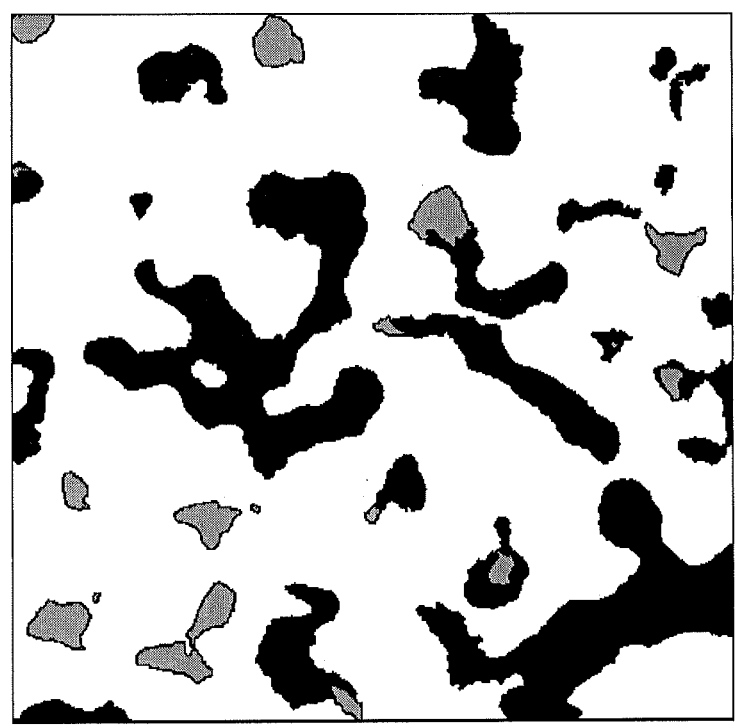
FIG. 1B is a schematic view showing locations of sulfides in the photograph showing the metallic structure in FIG. 1A.

Iron sulfide powder (S content: 36.48 mass %), copper powder and graphite powder were added to iron powder containing 0.3 mass % of Mn, at a ratio shown in Table 1, and were mixed, to prepare raw powder. The raw powder was compacted into a ring compact having an outer diameter of 75 mm, an inner diameter of 45 mm, and a height of 51 mm or a prismatic compact 10 by 10 by 100 mm, at a compacting pressure of 600 MPa. Next, the compacts were sintered at 1130° C. under a non-oxidizing gas, were left at 850° C. under a carburizing gas, and were oil-cooled. Then, the compacts were annealed at 180° C. and therefore, sintered member samples, Sample Nos. 01 to 39, were produced. The overall composition of these samples is shown in Table 1.

With respect to the produced samples, a sectional structure was observed, and an area ratio of sulfides and martensitic phases was measured using image analysis software (trade name: WinROOF, produced by Mitani Corporation). These results are shown in Table 1. Here, the area ratio of the martensitic phase was called "Mt phase" in Table 1.

In addition, the sintered member in a ring shape was vacuum-impregnated with a lubricating oil corresponding to ISOVG 460 (kinematic viscosity at 40° C. of 460 cSt), and was processed in a shape having an outer diameter of 70 mm, an inner diameter of 50 mm, and a height of 50 mm, using a lathe. Then, sintering time was measured by a bearing tester using SCM435H thermal refined material according to the Japanese Industrial Standards, as a mated material. Specifically, in a bearing test, the sintered member in an annular shape was fixed to a housing, and a shaft made of a mated material was inserted into an inner circumferential surface thereof. The shaft was swing-rotated at a sliding speed of 2.0 m per minute over 60° C., while applying load in a radial direction, so as to apply a surface pressure of 60 MPa. It was stopped for 0.5 seconds at end positions of the swing motion, respectively. Then, a condition in which the friction coefficient exceeded 0.3 was judged as a baked condition, and sliding time to attain the baked condition was measured as the baking time. This result is also shown in Table 1.

Furthermore, the sintered material in a prismatic shape was processed into a shape of No. 10 test pieces according to JIS Z2201 to produce a piece for a tensile strength test, and tensile strength was measured using an autograph produced by Shimadzu Corporation according to a method according to JIS Z2241. These results are also shown in Table 1.

TABLE 1

| Sample Number | Iron powder | Mixing ratio mass % | | | Overall composition mass % | | | | | Sulfide area % | Mt phase area % | Sintering time (h) | Tensile strength (Mpa) |
|---|---|---|---|---|---|---|---|---|---|---|---|---|---|
| | | Sulfide powder | Copper powder | Graphite powder | Fe | Cu | C | Mn | S | | | | |
| 01 | Balance | 0.50 | 0.1 | 1.0 | Balance | 0.1 | 1.0 | 0.30 | 0.18 | 0.3 | 93.0 | 1 | 720 |
| 02 | Balance | 0.75 | 0.1 | 1.0 | Balance | 0.1 | 1.0 | 0.29 | 0.27 | 0.7 | 93.0 | 2 | 640 |
| 03 | Balaance | 1.00 | 0.1 | 1.0 | Balance | 0.1 | 1.0 | 0.29 | 0.36 | 1.0 | 92.0 | 6 | 590 |

TABLE 1-continued

| Sample Number | Mixing ratio mass % | | | | Overall composition mass % | | | | | Sulfide area % | Mt phase area % | Sintering time (h) | Tensile strength (Mpa) |
|---|---|---|---|---|---|---|---|---|---|---|---|---|---|
| | Iron powder | Sulfide powder | Copper powder | Graphite powder | Fe | Cu | C | Mn | S | | | | |
| 04 | Balance | 1.30 | 0.1 | 1.0 | Balance | 0.1 | 1.0 | 0.29 | 0.47 | 1.0 | 90.0 | 15 | 570 |
| 05 | Balance | 1.50 | 0.1 | 1.0 | Balance | 0.1 | 1.0 | 0.29 | 0.55 | 2.0 | 90.0 | 20 | 550 |
| 06 | Balance | 2.00 | 0.1 | 1.0 | Balance | 0.1 | 1.0 | 0.29 | 0.73 | 3.0 | 90.0 | 24 | 530 |
| 07 | Balance | 3.00 | 0.1 | 1.0 | Balance | 0.1 | 1.0 | 0.29 | 1.09 | 5.0 | 88.0 | 29 | 490 |
| 08 | Balance | 4.00 | 0.1 | 1.0 | Balance | 0.1 | 1.0 | 0.28 | 1.46 | 6.0 | 84.0 | 33 | 450 |
| 09 | Balance | 4.60 | 0.1 | 1.0 | Balance | 0.1 | 1.0 | 0.28 | 1.68 | 7.0 | 80.0 | 34 | 400 |
| 10 | Balance | 4.70 | 0.1 | 1.0 | Balance | 0.1 | 1.0 | 0.28 | 1.71 | 7.0 | 75.0 | 34 | 360 |
| 11 | Balance | 5.00 | 0.1 | 1.0 | Balance | 0.1 | 1.0 | 0.28 | 1.82 | 9.0 | 75.0 | 34 | 250 |
| 12 | Balance | 0.50 | 5.0 | 1.0 | Balance | 5.0 | 1.0 | 0.28 | 0.18 | 0.3 | 93.0 | 1 | 950 |
| 13 | Balance | 0.75 | 5.0 | 1.0 | Balance | 5.0 | 1.0 | 0.28 | 0.27 | 0.7 | 93.0 | 2 | 860 |
| 14 | Balance | 1.00 | 5.0 | 1.0 | Balance | 5.0 | 1.0 | 0.28 | 0.36 | 1.0 | 92.0 | 7 | 770 |
| 15 | Balance | 1.30 | 5.0 | 1.0 | Balance | 5.0 | 1.0 | 0.28 | 0.47 | 1.0 | 90.0 | 16 | 740 |
| 16 | Balance | 1.50 | 5.0 | 1.0 | Balance | 5.0 | 1.0 | 0.28 | 0.55 | 2.0 | 90.0 | 22 | 720 |
| 17 | Balance | 2.00 | 5.0 | 1.0 | Balance | 5.0 | 1.0 | 0.28 | 0.73 | 3.0 | 90.0 | 28 | 690 |
| 18 | Balance | 3.00 | 5.0 | 1.0 | Balance | 5.0 | 1.0 | 0.27 | 1.09 | 5.0 | 88.0 | 33 | 640 |
| 19 | Balance | 4.00 | 5.0 | 1.0 | Balance | 5.0 | 1.0 | 0.27 | 1.46 | 6.0 | 84.0 | 36 | 590 |
| 20 | Balance | 4.60 | 5.0 | 1.0 | Balance | 5.0 | 1.0 | 0.27 | 1.68 | 7.0 | 80.0 | 38 | 520 |
| 21 | Balance | 4.70 | 5.0 | 1.0 | Balance | 5.0 | 1.0 | 0.27 | 1.71 | 7.0 | 75.0 | 38 | 470 |
| 22 | Balance | 5.00 | 5.0 | 1.0 | Balance | 5.0 | 1.0 | 0.27 | 1.82 | 9.0 | 75.0 | 38 | 330 |
| 23 | Balance | 0.50 | 10.0 | 1.0 | Balance | 10.0 | 1.0 | 0.27 | 0.18 | 0.3 | 93.0 | 1 | 540 |
| 24 | Balance | 0.75 | 10.0 | 1.0 | Balance | 10.0 | 1.0 | 0.26 | 0.27 | 0.7 | 93.0 | 2 | 480 |
| 25 | Balance | 1.00 | 10.0 | 1.0 | Balance | 10.0 | 1.0 | 0.26 | 0.36 | 1.0 | 92.0 | 8 | 430 |
| 26 | Balance | 1.30 | 10.0 | 1.0 | Balance | 10.0 | 1.0 | 0.26 | 0.47 | 1.0 | 90.0 | 19 | 430 |
| 27 | Balance | 1.50 | 10.0 | 1.0 | Balance | 10.0 | 1.0 | 0.26 | 0.55 | 2.0 | 90.0 | 25 | 410 |
| 28 | Balance | 2.00 | 10.0 | 1.0 | Balance | 10.0 | 1.0 | 0.26 | 0.73 | 3.0 | 90.0 | 34 | 400 |
| 29 | Balance | 3.00 | 10.0 | 1.0 | Balance | 10.0 | 1.0 | 0.26 | 1.09 | 5.0 | 88.0 | 38 | 370 |
| 30 | Balance | 4.00 | 10.0 | 1.0 | Balance | 10.0 | 1.0 | 0.26 | 1.46 | 6.0 | 84.0 | 41 | 350 |
| 31 | Balance | 4.60 | 10.0 | 1.0 | Balance | 10.0 | 1.0 | 0.25 | 1.68 | 7.0 | 80.0 | 44 | 300 |
| 32 | Balance | 4.70 | 10.0 | 1.0 | Balance | 10.0 | 1.0 | 0.25 | 1.71 | 7.0 | 75.0 | 44 | 250 |
| 33 | Balance | 5.00 | 10.0 | 1.0 | Balance | 10.0 | 1.0 | 0.25 | 1.82 | 9.0 | 75.0 | 44 | 150 |
| 34 | Balance | 3.00 | 5.0 | 0.0 | Balance | 5.0 | 0.0 | 0.28 | 1.09 | 5.0 | 0.0 | 0 | 260 |
| 35 | Balance | 3.00 | 5.0 | 0.2 | Balance | 5.0 | 0.2 | 0.28 | 1.09 | 5.0 | 84.0 | 28 | 550 |
| 36 | Balance | 3.00 | 5.0 | 0.4 | Balance | 5.0 | 0.4 | 0.27 | 1.09 | 5.0 | 88.0 | 30 | 640 |
| 37 | Balance | 3.00 | 5.0 | 0.6 | Balance | 5.0 | 0.6 | 0.27 | 1.09 | 5.0 | 87.0 | 31 | 670 |
| 18 | Balance | 3.00 | 5.0 | 1.0 | Balance | 5.0 | 1.0 | 0.27 | 1.09 | 5.0 | 88.0 | 33 | 640 |
| 38 | Balance | 3.00 | 5.0 | 1.2 | Balance | 5.0 | 1.2 | 0.27 | 1.09 | 5.0 | 88.0 | 34 | 560 |
| 39 | Balance | 3.00 | 5.0 | 1.4 | Balance | 5.0 | 1.4 | 0.27 | 1.09 | 5.0 | 88.0 | 32 | 360 |

Figure 2:
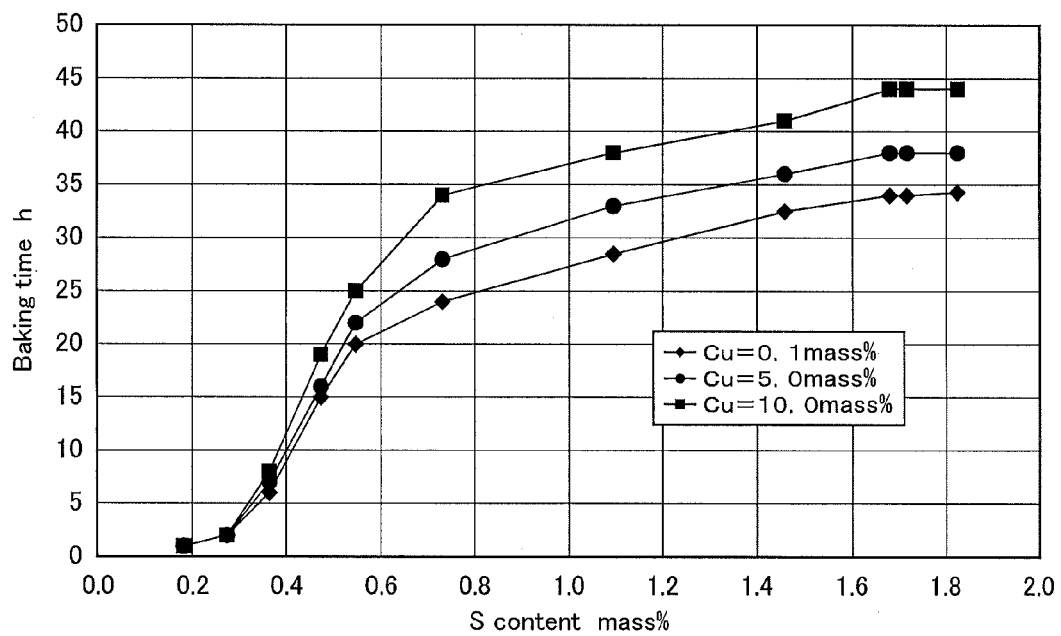
FIG. 2 is a graph showing the relationship between sintering time and S content in the overall composition.

With respect to the samples, Samples Nos. 01 to 33, in Table 1, the relationship between the sintering time and the S content in the overall composition is shown in FIG. 2. As is apparent from FIG. 2, in the samples in which the S content was 0.18 mass % or 0.27 mass %, the sulfide was slightly precipitated and the sintering time was as short as 2 hours or even less, even if the Cu content was any one of 0.1 mass %, 5.0 mass %, and 10.0 mass %. However, in the samples in which the S content was 0.36 mass %, the sintering time was remarkably longer than those of the samples in which the S content was 0.18 mass % or 0.27 mass %. In addition, when the S content was 1.68 mass % or less, regardless of the Cu content, the sintering time was increased as the S content increased. However, when the S content exceeded 1.68 mass %, the sintering time was not further increased, even if the S content was further increased.

Furthermore, in comparison with the samples in which the Cu content was 0.1 mass %, 5.0 mass %, and 10.0 mass %, the higher the Cu content, the longer the sintering time, and as a result, the matrix was remarkably strengthened. However, in the samples in which the Cu content was 0.1 mass % also, the sintering time was improved by dispersing metal sulfide, and the samples were satisfactory in practical use.

Figure 3:
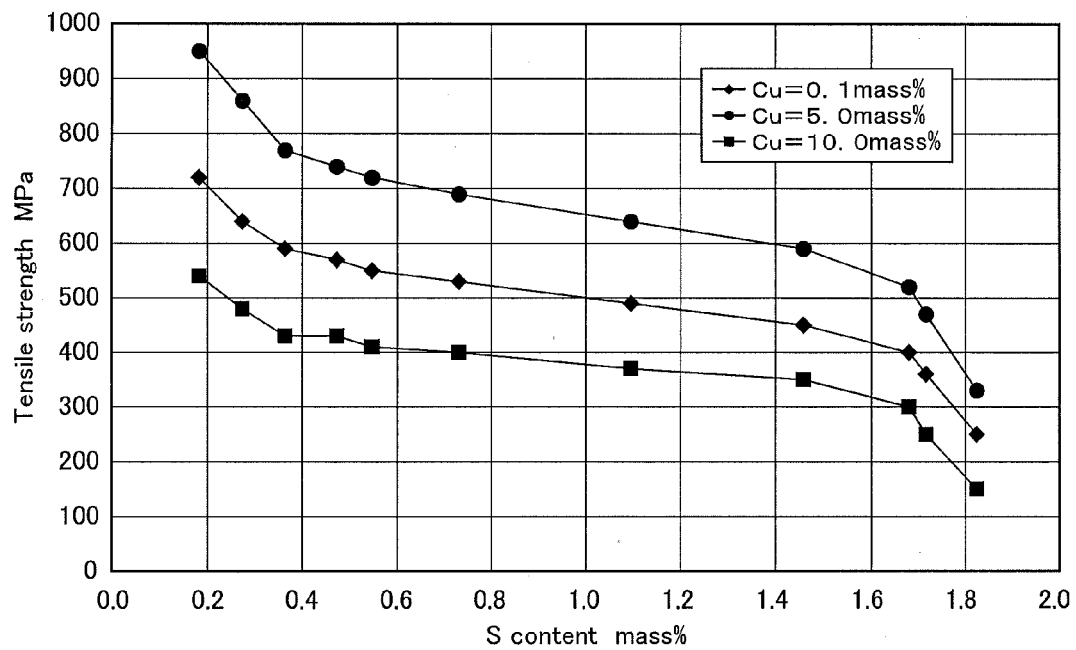
FIG. 3 is a graph showing the relationship between tensile strength and S content in the overall composition.

With respect to the samples, Samples Nos. 01 to 33, in Table 1, the relationship between the tensile strength and the S content in the overall composition is shown in FIG. 3. As is apparent from FIG. 3, the tensile strength was decreased as the S content increased, even if the Cu content was any one of 0.1 mass %, 5.0 mass %, and 10.0 mass %. In particular, in the samples in which the S content exceeded 1.68 mass %, the tensile strength was remarkably decreased regardless of the Cu content.

Additionally, in comparison with the samples in which the Cu content was 0.1 mass %, 5.0 mass %, and 10.0 mass %, when the Cu content was 5.0 mass %, the tensile strength was highest, and when it exceeded 5.0 mass %, the tensile strength was decreased. In the samples in which the Cu content was 10.0 mass %, the tensile strength was still practical. However, when the Cu content exceeded 10.0 mass %, the tensile strength was further decreased. Therefore, the Cu content in the present invention was set to be 10.0 mass % or less.

As described above, it was confirmed that the S content in the overall composition was 0.36 to 1.68 mass % from the point of view of lubricity and strength. Here, the area ratio of the sulfide in the samples in which the S content was 0.36 mass % was 1% by cross sectional area ratio, even if the Cu content was any one of 0.1 mass %, 5.0 mass %, and 10.0 mass %. In addition, in the sample in which the S content was 1.68 mass %, the area ratio of the sulfide was 7%, regardless of the Cu content. Therefore, when the area ratio of the sulfide was in a range from 1 to 7%, the lubricity was superior and the strength was not remarkably decreased. Furthermore, when the Cu content was in a range of 0.1 to 10.0 mass %, the strength was superior.

Figure 4:
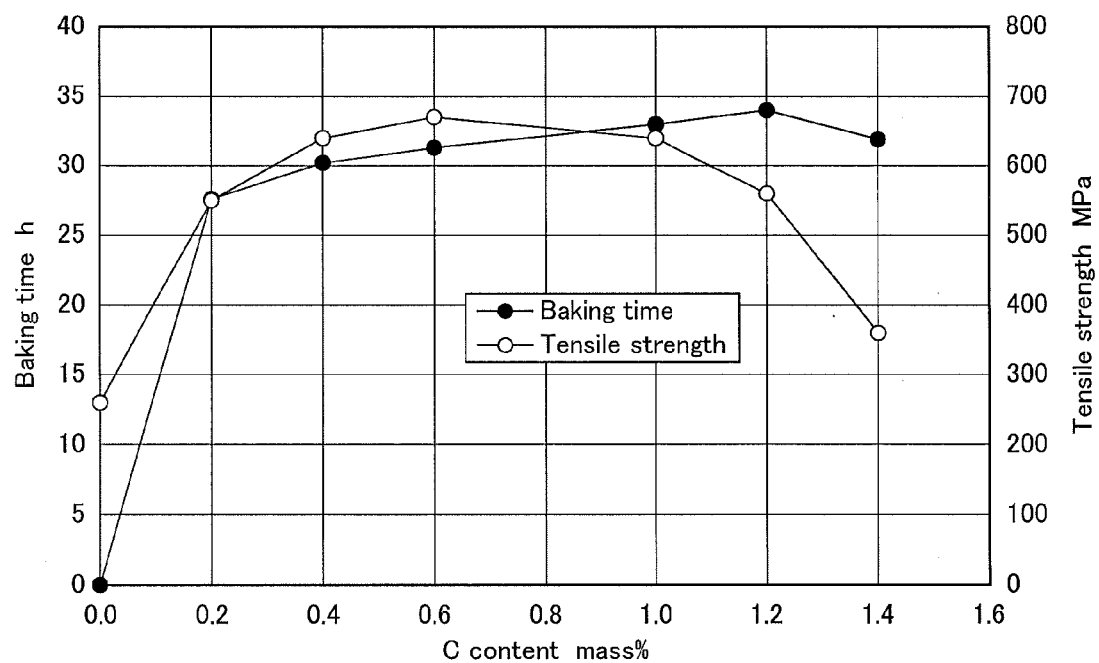
FIG. 4 is a graph showing the relationship between sintering time and tensile strength and C content in the overall composition.

With respect to the samples, Samples Nos. 18, 34 to 39, in Table 1, the relationship between the sintering time and the tensile strength and the C content in the overall composition is shown in FIG. 4. As is apparent from FIG. 4, in the samples in which the C content was 0 mass %, the strength of the matrix was low, and the sintering time was 0 hours, and as a result, seizing was immediately generated. However, in the samples in which the C content was 0.2 mass %, the matrix was strengthened and the sintering time was remarkably improved. In addition, when the C content was 1.2 mass % or less, the sintering time was prolonged as the C content increased. However, in the sample in which the C content exceeded 1.2 mass %, the sintering time was conversely shortened.

In the samples in which the C content was 0 mass %, the strength of the matrix was low and the tensile strength was low. In contrast, in the samples in which the C content was 0.2 mass %, the matrix was strengthened, and the tensile strength was improved. Furthermore, when the C content was 0.6 mass % or less, the tensile strength was increased as the C content increased. However, when the C content exceeded 0.6 mass %, the tensile strength was decreased, and in the samples in which the C content exceeded 1.2 mass %, the tensile strength was remarkably decreased.

Therefore, the C content in the overall composition was set to be 0.2 to 1.2 mass %.

The invention claimed is:

1. A sliding bearing assembly for joints of construction equipment, comprising at least:
   a shaft; and
   a bush made of an iron-based sintered material configured to function as a sliding bearing,
   wherein the bush has an overall composition consisting of, by mass %, 0.1 to 10% of Cu, 0.2 to 1.2% of C, 0.03 to 0.9% of Mn, 0.36 to 1.68% of S, and the balance of Fe and inevitable impurities, and
   a matrix having a metal structure comprising: (i) a martensite structure as a primary structure, (ii) pores dispersed in the matrix, and (iii) sulfide particles precipitated and dispersed in the matrix mainly consisting of iron sulfide, in which
   a content of the sulfide particles in the matrix is 1 to 7 volume % of the matrix.

2. The sliding bearing assembly according to claim 1, wherein the martensite structure in the matrix is 80% or more by cross sectional area ratio.

3. The sliding bearing assembly according to claim 1, wherein the sliding bearing assembly is used under a sliding condition in which a surface pressure is 60 MPa or more and a maximum rotating speed is 1.2 to 3 m per minute.

4. A sliding bearing assembly for joints of construction equipment, comprising at least:
   a shaft; and
   a bush made of an iron-based sintered material configured to function as a sliding bearing,
   wherein the bush has an overall composition consisting of, by mass %, 0.1 to 10% of Cu, 0.2 to 1.2% of C, 0.03 to 0.3% of Mn, 0.36 to 1.68% of S, and the balance of Fe and inevitable impurities, and
   a matrix having a metal structure comprising: (i) a martensite structure as a primary structure, (ii) pores dispersed in the matrix, and (iii) sulfide particles precipitated and dispersed in the matrix mainly consisting of iron sulfide, in which
   a content of the sulfide particles in the matrix is 1 to 7 volume % of the matrix.

5. The sliding bearing assembly according to claim 4, wherein the martensite structure in the matrix is 80% or more by cross sectional area ratio.

6. The sliding bearing assembly according to claim 4, wherein the sliding bearing assembly is used under a sliding condition in which a surface pressure is 60 MPa or more and a maximum rotating speed is 1.2 to 3 m per minute.

* * * * *